US012762229B2

(12) United States Patent
Gaubitch et al.

(10) Patent No.: US 12,762,229 B2
(45) Date of Patent: Oct. 13, 2026

(54) PRESENTATION ATTACKS IN REVERBERANT CONDITIONS

(71) Applicant: PINDROP SECURITY, INC., Atlanta, GA (US)

(72) Inventors: Nikolay Gaubitch, Atlanta, GA (US); David Looney, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 119 days.

(21) Appl. No.: 18/598,595

(22) Filed: Mar. 7, 2024

(65) Prior Publication Data

US 2024/0311474 A1 Sep. 19, 2024

Related U.S. Application Data

(60) Provisional application No. 63/452,351, filed on Mar. 15, 2023.

(51) Int. Cl.
*G06F 21/55* (2013.01)
*G06N 20/00* (2019.01)
(Continued)

(52) U.S. Cl.
CPC ........... *G06F 21/554* (2013.01); *G06N 20/00* (2019.01); *G10L 25/18* (2013.01); *G10L 25/51* (2013.01);
(Continued)

(58) Field of Classification Search
CPC . G06F 21/554; G06F 2221/034; G06N 20/00; G10L 25/18; G10L 25/51; G10L 25/69; G10L 25/30; G10L 17/26
(Continued)

(56) References Cited

U.S. PATENT DOCUMENTS 9,761,223 B2 * 9/2017 Blommer ................ G10L 15/08
10,593,336 B2 * 3/2020 Boyadjiev ............... G06F 21/32
(Continued)

FOREIGN PATENT DOCUMENTS

EP 2830043 A2 * 1/2025 ............. G10K 15/12
WO WO-2024256334 A1 * 12/2024 ............ G01V 1/303

OTHER PUBLICATIONS

Al-Ali, et al. (Sep. 2017). Enhanced forensic speaker verification using multi-run ICA in the presence of environmental noise and reverberation conditions. In 2017 IEEE International Conference on Signal and Image Processing Applications (ICSIPA) (pp. 174-179). IEEE. (Year: 2017).*
(Continued)

*Primary Examiner* — Philip J Chea
*Assistant Examiner* — Dorianne Alvarado David
(74) *Attorney, Agent, or Firm* — Foley & Lardner LLP

(57) ABSTRACT

Embodiments include a computing device that executes software routines and/or one or more machine-learning architectures including obtaining training audio signals having corresponding training impulse responses associated with reverberation degradation, training a machine-learning model of a presentation attack detection engine to generate one or more acoustic parameters by executing the presentation attack detection engine using the training impulse responses of the training audio signals and a loss function, obtaining an audio signal having an acoustic impulse response associated with reverberation degradation caused by one or more rooms, generating the one or more acoustic parameters for the audio signal by executing the machine-learning model using the audio signal as input, and generating an attack score for the audio signal based upon the one or more parameters generated by the machine-learning model.

20 Claims, 4 Drawing Sheets

(51) Int. Cl.
*G10L 25/18* (2013.01)
*G10L 25/51* (2013.01)
*G10L 25/69* (2013.01)

(52) U.S. Cl.
CPC ........ *G10L 25/69* (2013.01); *G06F 2221/034* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 11,947,946 | B1 * | 4/2024 | Rao | G06N 20/20 |
| 12,014,748 | B1 * | 6/2024 | Giri | G10L 21/034 |
| 12,323,449 | B1 * | 6/2025 | Graves | G06F 8/75 |
| 2012/0290297 | A1 * | 11/2012 | Baughman | G10L 17/22 704/E15.039 |
| 2014/0161270 | A1 * | 6/2014 | Peters | G10L 25/24 381/63 |
| 2016/0118038 | A1 * | 4/2016 | Eaton | G10L 21/0208 381/63 |
| 2016/0142854 | A1 * | 5/2016 | Fueg | G10K 15/08 381/23 |
| 2018/0254046 | A1 * | 9/2018 | Khoury | G10L 25/24 |
| 2019/0028484 | A1 * | 1/2019 | Truong | H04L 9/3271 |
| 2019/0189129 | A1 * | 6/2019 | Arakawa | A61B 5/1171 |
| 2019/0311730 | A1 * | 10/2019 | Looney | G10L 25/90 |
| 2020/0322377 | A1 * | 10/2020 | Lakhdhar | G10L 17/04 |
| 2020/0396249 | A1 * | 12/2020 | Shabtai | H04L 63/1433 |
| 2021/0142815 | A1 * | 5/2021 | Bryan | G10K 15/02 |
| 2021/0233541 | A1 * | 7/2021 | Chen | G10L 17/02 |
| 2021/0280171 | A1 * | 9/2021 | Phatak | G06N 3/045 |
| 2022/0059121 | A1 * | 2/2022 | Rao | G06N 20/20 |
| 2022/0070207 | A1 * | 3/2022 | Simonchik | G10L 15/16 |
| 2022/0101623 | A1 * | 3/2022 | Walsh | G06V 10/82 |
| 2022/0122627 | A1 * | 4/2022 | Li | H04R 3/005 |
| 2022/0165297 | A1 * | 5/2022 | Wang | G10L 15/142 |
| 2023/0073364 | A1 * | 3/2023 | Malik | G10L 25/24 |
| 2023/0115674 | A1 * | 4/2023 | Nighman | H04R 1/406 381/58 |
| 2024/0005908 | A1 * | 1/2024 | Sharma | G10L 15/02 |
| 2024/0055012 | A1 * | 2/2024 | Wang | G10L 21/0208 |
| 2024/0170002 | A1 * | 5/2024 | Li | G10L 25/21 |
| 2024/0363125 | A1 * | 10/2024 | Khoury | G10L 17/26 |
| 2025/0055942 | A1 * | 2/2025 | Nighman | H04M 3/568 |
| 2025/0291936 | A1 * | 9/2025 | Dambrot | G06F 21/577 |
| 2026/0088032 | A1 * | 3/2026 | Lopez | G10L 17/06 |

OTHER PUBLICATIONS

Al-Karawi, et al. (Aug. 2017). Robust speaker verification in reverberant conditions using estimated acoustic parametersâa maximum likelihood estimation and training on the fly approach. In 2017 seventh international conference on innovative computing technology (InTech) (pp. 52-57). IEEE. (Year: 2017).*

Antispoofing. (Nov. 9, 2022). Audio Replay Attacks and Countermeasures Against Them. Antispoofing Blog. https://antispoofing.org/audio-replay-attacks-and-countermeasures-against-them/ (Year: 2022).*

Chen, et al. (Jun. 2021). Improving speaker verification in reverberant environments. In ICASSP 2021-2021 IEEE International Conference on Acoustics, Speech and Signal Processing (ICASSP) (pp. 5854-5858). IEEE. (Year: 2021).*

Eaton, et al. (2016). Estimation of room acoustic parameters: The ACE challenge. IEEE/ACM Transactions on Audio, Speech, and Language Processing, 24(10), 1681-1693. (Year: 2016).*

Haeussler, et al. (2019). Crispness, speech intelligibility, and coloration of reverberant recordings played back in another reverberant room (Room-In-Room). The Journal of the Acoustical Society of America, 145(2), 931-944. (Year: 2019).*

Kamble, et al. (May 2019). Analysis of reverberation via teager energy features for replay spoof speech detection. In ICASSP 2019—2019 IEEE International Conference on Acoustics, Speech and Signal Processing (ICASSP) (pp. 2607-2611). IEEE. (Year: 2019).*

Kamble, et al. (Dec. 2022). The Impact of Room Acoustics on Replay Speech Signal. In 2022 13th International Symposium on Chinese Spoken Language Processing (ISCSLP) (pp. 105-109). IEEE. (Year: 2022).*

Korshunov, et al. (Jan. 2018). On the use of convolutional neural networks for speech presentation attack detection. In 2018 IEEE 4th international conference on identity, security, and behavior analysis (ISBA) (pp. 1-8). IEEE. (Year: 2018).*

Le, et al. (May 2019). Discriminate natural versus loudspeaker emitted speech. In ICASSP 2019—2019 IEEE International Conference on Acoustics, Speech and Signal Processing (ICASSP) (pp. 501-505). IEEE. (Year: 2019).*

Looney, et al. (May 2020). Joint estimation of acoustic parameters from single-microphone speech observations. In ICASSP 2020—2020 IEEE International Conference on Acoustics, Speech and Signal Processing (ICASSP) (pp. 431-435). IEEE. (Year: 2020).*

Looney, et al. (Jun. 2021). On the detection of pitch-shifted voice: Machines and human listeners. In ICASSP 2021—2021 IEEE International Conference on Acoustics, Speech and Signal Processing (ICASSP) (pp. 5804-5808). IEEE. (Year: 2021).*

Nautsch, et al. (2021). ASVspoof 2019: Spoofing countermeasures for the detection of synthesized, converted and replayed speech. IEEE Transactions on Biometrics, Behavior, and Identity Science, 3(2), 252-265. (Year: 2021).*

Sahidullah, et al. (Feb. 24, 2023). Introduction to voice presentation attack detection and recent advances. Handbook of Biometric Anti-Spoofing: Presentation Attack Detection and Vulnerability Assessment, 339-385. (Year: 2023).*

Tian, et al. (2016). An investigation of spoofing speech detection under additive noise and reverberant conditions. In Interspeech 2016 Sep. 8â12, 2016, San Francisco, USA (pp. 1715-1719). (Year: 2016).*

Wang, et al. (2022). A practical guide to logical access voice presentation attack detection. In Frontiers in Fake Media Generation and Detection (pp. 169-214). Singapore: Springer Nature Singapore. (Year: 2022).*

Alegre et al. (Sep. 2013). A one-class classification approach to generalised speaker verification spoofing countermeasures using local binary patterns. In 2013 IEEE Sixth International Conference on Biometrics: Theory, Applications and Systems (BTAS) (pp. 1-8). IEEE. (Year: 2013).*

Jeub et al. (Jul. 2009). A binaural room impulse response database for the evaluation of dereverberation algorithms. In 2009 16th international conference on digital signal processing (pp. 1-5). IEEE. (Year: 2009).*

Liu et al. (2023). Asvspoof 2021: Towards spoofed and deepfake speech detection in the wild. IEEE/ACM Transactions on Audio, Speech, and Language Processing, 31, 2507-2522. (Year: 2023).*

Shim, et al. (Nov. 2018). Replay spoofing detection system for automatic speaker verification using multi-task learning of noise classes. In 2018 Conference on Technologies and Applications of Artificial Intelligence (TAAI) (pp. 172-176). IEEE. (Year: 2018).*

* cited by examiner

PRESENTATION ATTACKS IN REVERBERANT CONDITIONS

CROSS-REFERENCE TO RELATED APPLICATION

This application claims the benefit of U.S. Provisional Application No. 63/452,351, filed Mar. 15, 2023, which is incorporated by reference in its entirety.

TECHNICAL FIELD

This application generally relates to systems and methods for training and deploying machine-learning architectures detecting and mitigating fraud in communication channels. In particular, machine-learning architectures for presentation attack detection (PAD) that detect and mitigate instances of presentation attacks using characteristics of call data, such as acoustic characteristics of reverberation or other degradation in the audio data.

BACKGROUND

Automatic speaker verification (ASV) or automatic speaker recognition (ASR) systems are becoming increasingly popular in a connected world. As the ASV technologies grow in popularity and sophistication, so does the popularity and sophistication of technologies for defrauding or fooling ASV systems. There is a growing need to make ASVs not only more accurate but also secure to potential misuse.

A common form of fraudulent or spoofing activity deployed against ASVs includes presentation attacks, such as replay attacks or synthetic speech attacks (e.g., deepfakes or text-to-speech). For instance, in a replay attack, a recording of a target voice is replayed through a loudspeaker to the ASV system. Similarly, in synthetic speech attacks, a computer program executes deepfake software or text-to-speech (TTS) software to generate a fraudulent speech signal having similar acoustics as the target voice.

To combat presentation attacks, ASVs or other voice-sensitive systems have implemented PAD systems. Conventional PAD systems treat PAD as a classification machine learning problem where the machine-learning models of machine-learning architecture are trained on examples of spoofed or bona fide voice recordings, using traditional feature design and/or end-to-end deep learning approaches. Other conventional PAD systems employed one-class detection of modified or synthetic speech.

However, the conventional approaches of PAD systems that focus training on voice samples to learn voice features have some drawbacks. For example, the conventional PAD systems can be fooled with a well-formed presentation audio recording. As another example, the conventional PAD systems often require significant amounts of training voice audio samples to achieve a meaningful level of accuracy. Few, if any, PAD systems have focused on non-voice characteristics in the audio signal for detecting presentation attacks.

SUMMARY

Disclosed herein are systems and methods capable of addressing the above-described shortcomings and may also provide any number of additional or alternative benefits and advantages. Embodiments include software and hardware components for hosting and implementing a PAD program that includes various software components of a machine-learning architecture. The PAD program may analyze room acoustics independently, or in conjunction with, voice acoustics in order to detect presentation attacks directed at a voice interface system, such as a voice biometrics system, ASV system, ASR system, and/or interactive voice response (IVR) system, among others.

In one embodiment, a computer-implemented method may include obtaining, by the computer, a plurality of training audio signals having corresponding training acoustic impulse responses including at least one single-room training acoustic impulse response and at least one multi-room training acoustic impulse response, training, by the computer, a parameter estimation machine-learning model of a presentation attack detection (PAD) engine to estimate one or more acoustic parameters by executing the parameter estimation machine-learning model of the PAD engine using the training acoustic impulse responses of the plurality of training audio signals and a loss function, obtaining, by the computer, an audio signal having an acoustic impulse response caused by one or more rooms, and generating, by the computer, the one or more acoustic parameters for the audio signal by executing the parameter estimation machine-learning model using the audio signal as input. The computer may generate an attack score for the audio signal based upon the one or more acoustic parameters by executing a PAD scoring the machine-learning model of the PAD engine, where the attack score indicates a likelihood that the acoustic impulse response of the audio signal is caused by two or more rooms.

The method may include detecting, by the computer, that the audio signal is a presentation attack in response to determining that the attack score satisfies an attack score threshold. When generating the attack score for the audio signal, the method may include determining, by the computer, whether the acoustic impulse response of the audio signal is consistent throughout the audio signal. The method may include segmenting, by the computer, the audio signal into a plurality of frames, wherein the computer executes the PAD engine using each frame of the audio signal as input to the PAD engine. The method may include transforming, by the computer, the audio signal into a spectral domain representation, wherein the computer executes the PAD engine using the spectral representation of the audio signal as input to the PAD engine. The one or more acoustic parameters may include at least one of: spectral standard deviation, late reverberation onset, or energy decay curve. The method may include extracting, by the computer, a feature vector for the one or more acoustic parameters of the acoustic impulse response of the audio signal. The method may include determining, by the computer, a speaker identity associated with the audio signal. When obtaining the plurality of training audio signals, the method may include generating, by the computer, one or more of the plurality of training audio signals according to a simulated environment. The acoustic impulse response of the audio signal may be a type of acoustic impulse response not represented in the training audio signals.

In another embodiment, a non-transitory, computer-readable medium may include instructions which, when executed by one or more processors, cause the one or more processors to obtain a plurality of training audio signals having corresponding training acoustic impulse responses including at least one single-room training acoustic impulse response and at least one multi-room training acoustic impulse response, train a parameter estimation machine-learning model of a presentation attack detection (PAD)

engine to estimate one or more acoustic parameters by executing the parameter estimation machine-learning model of the PAD engine using the training acoustic impulse responses of the plurality of training audio signals and a loss function, obtain an audio signal having an acoustic impulse response caused by one or more rooms, and generate the one or more acoustic parameters for the audio signal by executing the parameter estimation machine-learning model of the PAD engine using the audio signal as input. The instructions may further cause the one or more processors to generate an attack score for the audio signal based upon the one or more acoustic parameters executing a PAD scoring machine-learning model of the PAD engine, where the attack score indicates a likelihood that the acoustic impulse response of the audio signal is caused by two or more rooms.

The instructions may further cause the one or more processors to detect that the audio signal is a presentation attack in response to determining that the attack score satisfies an attack score threshold. When generating the attack score for the audio signal, the instructions may further cause the one or more processors to determine whether the acoustic impulse response of the audio signal is consistent throughout the audio signal. The instructions may further cause the one or more processors to segment the audio signal into a plurality of frames, wherein the computer executes the PAD engine using each frame of the audio signal as input to the presentation attack engine. The instructions may further cause the one or more processors to transform the audio signal into a spectral domain representation, wherein the computer executes the PAD engine using the spectral representation of the audio signal as input to the PAD engine. The one or more acoustic parameters may include at least one of spectral standard deviation, late reverberation onset, or energy decay curve or any other relevant room acoustic metrics related to the noise or reverberation of a room. The instructions may further cause the one or more processors to extract a feature vector for the one or more acoustic parameters of the acoustic impulse response of the audio signal. When obtaining the plurality of training audio signals, the instructions may cause the one or more processors to generate one or more of the plurality of training audio signals in a simulated environment. The acoustic impulse response of the audio signal may be a type of acoustic impulse response not represented in the training audio signals.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
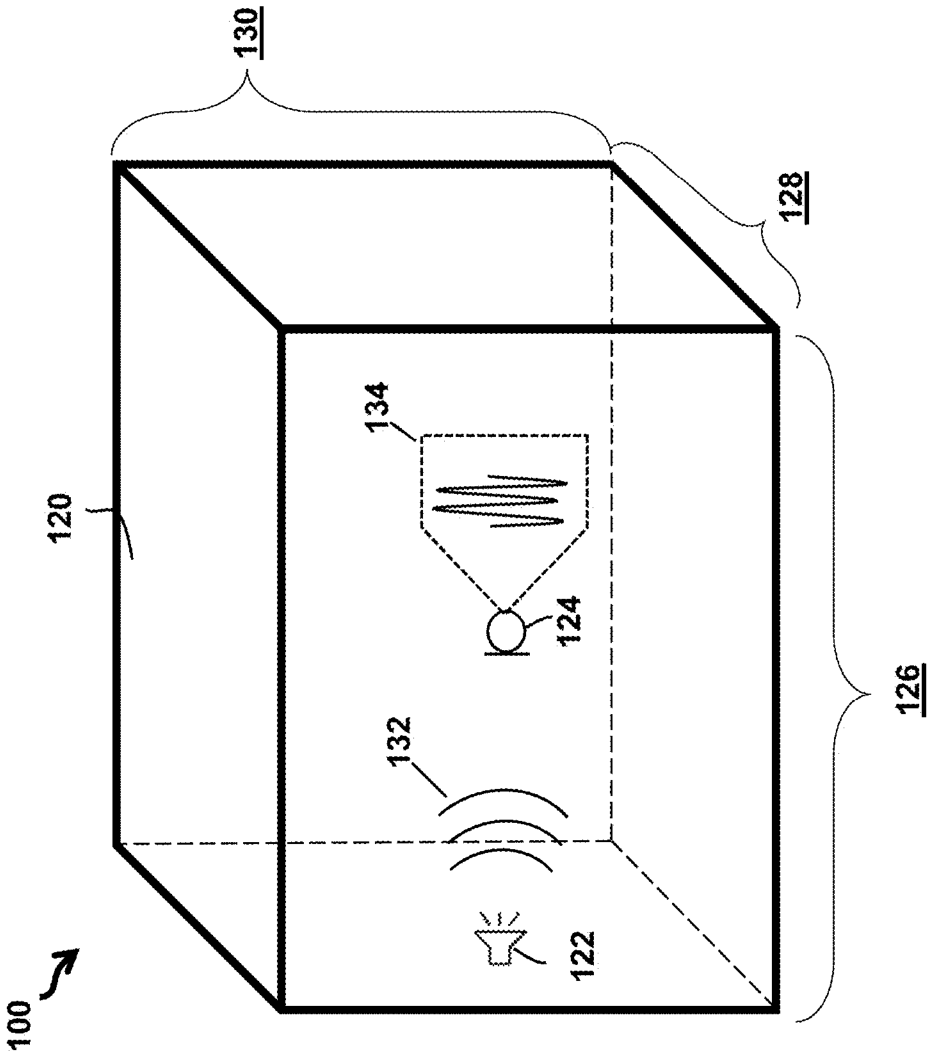
FIG. 1 shows a system for capturing audio data, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for processing various types of contact data associated with contact events (e.g., phone calls, VOIP calls, remote access, webpage access) for authentication and risk management. The contact data may include audio signals for speakers, software or protocol data, and inputs received from the end-user, among others. The processes described herein manage the types of data accessible to and employed by various machine-learning architectures that extract various types of contact data (e.g., call audio data, call metadata) from contact events and output authentication or risk threat determinations. Embodiments include a computing system having computing hardware and software components that actively or passively analyze contact data obtained from contact events to determine fraud risk scores or authentication scores associated with the contact events, end-users, or end-user devices.

Embodiments may include a computing device that executes software routines and/or one or more machine-learning architectures providing a means for PAD in audio signals, using acoustics of an enclosed acoustic environment containing a microphone from which an audio signal originated. A characteristic of presentation attacks in which live and replay recordings occur within enclosed reverberant environments is that the effects of reverberation degradation will differ. For instance, an acoustic signal containing a speech signal of a live speaker will have only one acoustic impulse response (AIR) caused by reverberation of the live speaker's environment, whereas a replayed acoustic signal containing a replayed speech signal will have two or more convolved AIRs caused by reverberation of multiple environments.

As described herein, a PAD engine of a machine-learning architecture includes software programming implementing machine-learning techniques and machine-learning models programmed and trained for distinguishing live speech against replayed speech using room acoustics and reverberation in order to detect presentation attacks and predict likely fraudulent attempts in calls. The PAD engine generally focuses on and analyzes room reverberation, analyzing several qualities of the AIR and the impact of the AIR on the room acoustics to detect replayed speech in presentation attacks. The PAD engine references one or more parameters to train a neural network, such as a convolutional neural network (CNN), or other types of machine-learning models for estimating the one or more parameters from audio signals and/or the speech signals of the audio signals. In some implementations, the one or more parameters are preconfigured. In some implementations, the PAD engine or other component of the machine-learning architecture may automatically determine the one or more parameters of the room acoustic characteristics, such as measurements of the reverberation degradation.

The acoustic environment from which an audio recording was captured and produced can be described or characterized according to certain acoustic parameters of an audio signal. These parameters are employed in computing operations associated with audio processing. Examples of such parameters include Signal-to-Noise Ratio (SNR), a measure of reverberation time (RT) (e.g., time needed for sound decay), and a parameter characterizing the early to late reverberation ratio (e.g., Direct-to-Reverberant Ratio (DRR), sound clarity at a given time interval, sound definition at a given time interval). The reverberation time for the acoustic environment can be characterized as the time for sound to decay by, for example, 60 dB or 30 dB (denoted as T60 or T30, respectively). The reverberation time can also be characterized as Early Decay Time (EDT), which is the time needed for the sound to decay by, for example, 10 dB. The early to late reverberation ratio can be characterized as the sound clarity at, for example, 50 ms or 80 ms (denoted as C50 or C80, respectively). The early to late reverberation ratio can also be characterized as the sound definition at, for example, 50 ms or 80 ms (denoted as D50 or D80, respectively). Various parameters characteristic of AIRs and convolved AIRs may be employed as well, such as an energy decay curve of an AIR, a spectral standard deviation of an AIR, and a late reverberation onset of an AIR.

The neural network of the PAD engine is trained using both synthetic and real room impulse response data. Synthetic data is generated by simulating random enclosed environments (e.g., rooms) with random microphone and audio source locations. This provides perfect knowledge of the impulse responses. Training audio signals for single-room and two-room scenarios are used for training, with the latter modeling replay attacks. The neural network architecture is trained to estimate one or more acoustic parameters, such as spectral standard deviation directly from reverberant speech signals of audio signals. During the training phase, a loss function compares outputted estimated parameters against true or expected parameters derived from the acoustic impulse responses. The loss function may adjust or tune the parameters or weights of the PAD engine's neural network architecture (or other type of machine-learning model) to reduce a level of error or loss between the estimated parameters and the expected parameters. In this way, the software programming of the machine-learning architecture may train the neural network architecture (or other machine-learning model) of the PAD engine without the need for training audio signals containing examples of actual replayed speech.

The PAD engine may implement zero-shot training for presentation attack detection in which training data for training the neural network of the PAD engine does not include presentation attack training signals. In an example, the neural network of the PAD engine is trained used training data including synthetically generated AIRs labeled with acoustic parameters such that the neural network of the PAD engine can estimate one or more acoustic parameters of an AIR of an input audio signal. In this example, based on the one or more estimated acoustic parameters of the AIR of the input audio signal, the PAD engine determines whether the input audio signal is characteristic of a presentation attack (e.g., the AIR is a convolved AIR of two or more AIRs).

In some implementations, the PAD engine may implement a zero-shot approach for presentation attack detection in which training data is not required for parameter estimation. In an example, a standard deviation function can be applied to spectral features of an input audio signal to estimate a spectral standard deviation (SSTD) of the input audio signal. In this way, the PAD engine may be used for zero-shot presentation attack detection without training a parameter estimation machine-learning model.

Example System Components

FIG. 1 shows a system 100 capturing audio signals, according to an embodiment. The system 100 may comprise a target audio source 122 and a microphone 124 in an enclosed acoustic space 120. The enclosed acoustic space 120 represents the environment through which a projected audio wave 132 propagates from a target audio source 122 towards a microphone 124. The enclosed acoustic space 120 is defined by a length 126, a height 130, and a depth 128. It should be understood that the components of the system 100 are merely illustrative. Other embodiments may include additional or alternative components, or omit components, from those of the system 100, but are still within the scope of this disclosure.

The target audio source 122 is a live person or a loudspeaker that emits a projected audio wave 132 into the enclosed acoustic space 120, which propagates to a microphone 124. The projected audio wave 132 may include, or represent, audio signals captured at the microphone 124 as an observed audio signal 134. The audio signals may contain speech signals as spoken audio waves originating from the target audio source 122. The audio signals may also contain various forms of degradation affecting or impacting the projected audio wave 132 or otherwise captured at the microphone 124.

Figure 2:
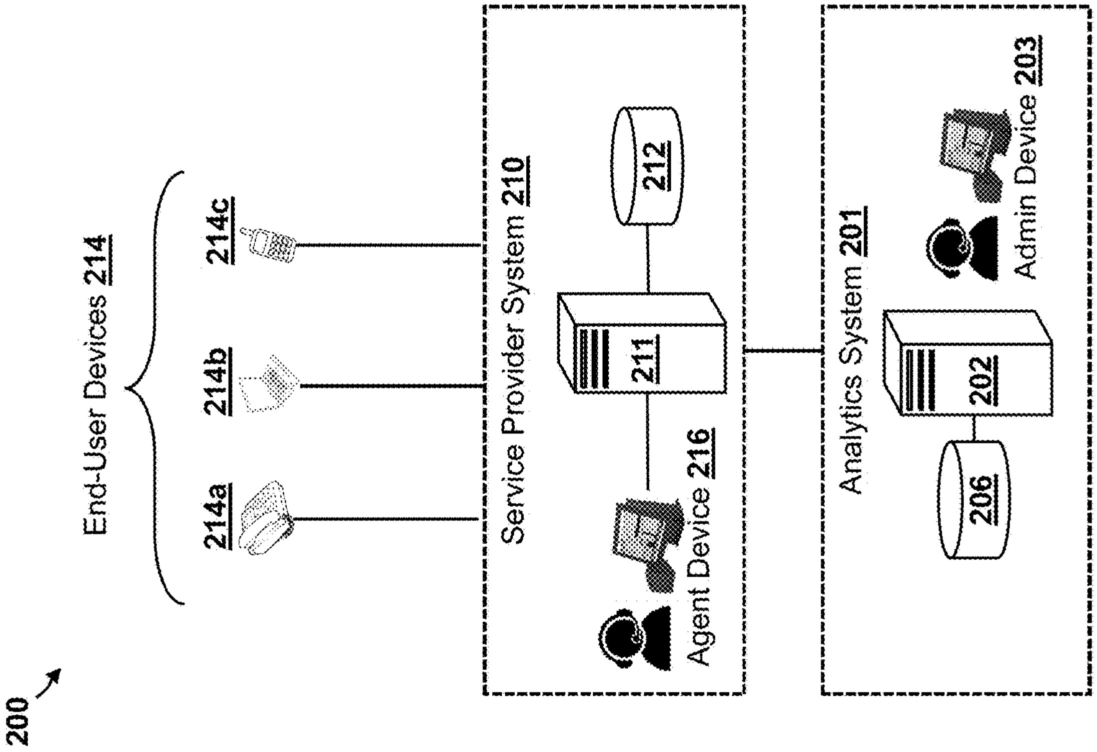
FIG. 2 shows components of a system for receiving and analyzing call data received during contact events, according to an embodiment.

The microphone 124 is any device or device component capable of capturing and interpreting the projected audio wave 132. As shown in FIG. 2, the microphone 124 may be a component of, or coupled to, various types of end-user device 214*a*-214*c* (generally referred to as end-user devices 214 or an end-user device 214). Non-limiting examples of the end-user devices 214 having the microphone 124 include landline phones 214*a*, mobile phones 214*b*, or computing devices 214*c* executing software and protocols for Internet-based mobile communications, such as Voice-over-IP communications (VOIP), such as laptops, desktops, tablets, edge IoT devices (e.g., voice assistance devices), and the like.

When the audio wave 132 containing a particular audio signal is projected from the target audio source 122 (e.g., the particular audio signal containing speech originating from the speaker), the microphone 124 captures the projected audio wave 132 (e.g., using a diaphragm) and converts the projected audio signal to an observed audio signal 134 (e.g., containing speech from the speaker-person or loudspeaker). It should be appreciated that embodiments may include any number of audio data input sources and microphones 124 or other receiver devices.

As the projected audio wave 132 (originating from the target audio source 122) propagates towards the microphone 124, degradation can affect the projected audio wave 132 if the projected audio wave 132 interacts with the features of the enclosed acoustic space 120 (e.g., boundaries, objects, background noise, ambient noise). As such, the observed audio signal 134 at the microphone 124 will be a function of the degradation impacting the projected audio wave 132.

For instance, reverberation degradation occurs when instances of the projected audio wave 132 are reflected (or reverberated) by the physical boundaries or objects of the enclosed acoustic space 120, such as walls or furniture. The reflected audio waves may be captured by the microphone 124 as acoustic impulse responses (sometimes referred to as room impulse responses), which the microphone 124 captures and encodes into the observed audio signal 134. The observed audio signal 134 may be represented by $x_A(n)$ as in Expression 1:

$$x_A(n) = s(n) * h_A(n) + v_A(n) \quad \text{Expression 1}$$

In Expression 1, s(n) represents a speech signal, $h_A(n)$ represents the acoustic impulse response (AIR), and $v_A(n)$ represents the ambient noise. As shown in Expression 1, the speech signal and the AIR are linearly convolved.

In the case where a speech signal is recorded in a first room and then played back in a second room, the observed audio signal in the second room will have an AIR which is a linear convolution of the AIR of the speech signal in the first room and the AIR of the played back speech signal in the second room, as in Expression 2 (ignoring ambient noise):

$$x_{AB}(n) = x_A(n) * h_B(n) = s(n) * h_{AB}(n) = s(n) * (h_A(n) * h_B(n)) \quad \text{Expression 2}$$

In Expression 2, ha (n) is the AIR of the first room, $h_B$ (n) is the AIR of the second room, and $h_{AB}(n)$ is the composite AIR of the convolved AIRs of the first room and the second room. The PAD engine may separate the convolved AIRs from the composite AIR from the observed audio signal 134 in order to identify convolved AIRs in detecting playback attacks.

Convolved AIRs have various acoustic parameters which distinguish convolved AIRs from single AIRs. The acoustic parameters of AIRs may be used to determine whether an AIR is plausible (i.e., whether the AIR corresponds to a single AIR from a single room). An example of an acoustic parameter of AIRs which can be used to analyze an AIR is the late reverberation onset of the AIR. An AIR formed by convolving two or more AIRs will generally have an earlier late reverberation onset than a single AIR.

A number of reflections in a single AIR after t seconds for a shoebox (i.e., rectangular prism) room is given in Expression 3:

$$n_A(t) = \frac{4\pi c^3 t^3}{3V_A} \quad \text{Expression 3}$$

In Expression 3, c is the speed of sound and $V_A$ is the room volume in cubic meters. However, the number of reflections in two convolved AIRs after t seconds for two shoebox rooms is given in Expression 4:

$$n_{AB}(t) = \frac{4\pi^2 c^6 t^6}{45 V_A V_B} \quad \text{Expression 4}$$

In Expression 4, $V_A$ is the room volume of the first room in cubic meters and $V_B$ is the room volume of the second room in cubic meters. Thus, for convolved AIRs, the number of reflections increases with the power of six rather than the power of three as for a single AIR. An acoustic parameter of echo density profile may be derived for measuring the onset of the diffuse reverberation tail in an AIR. The echo density profile for an AIR (or two convolved AIRs) may be written as given in Expression 5:

$$\eta(n) = \frac{1}{\operatorname{erfc}\left(\frac{1}{\sqrt{2}}\right)} \sum_{\tau=n-\delta}^{n+\delta} w(\tau) 1(|h(\tau)| > \sigma) \quad \text{Expression 5}$$

In Expression 5, w(n) is a sliding Hamming window of length 2δ+1 of length set at 20 ms, where "erfc" (sometimes referred to as "error function") is the complimentary error function, and where 1{•} is the indicator function which returns one (1) if the argument is true and zero (0) otherwise. Expression 5 provides and may be implemented as a means to measure the effect described by Expression 4. Moreover, σ is given in Expression 6:

$$\sigma = \sqrt{\sum_{\tau=n-\delta}^{t+\delta} w(\tau) h^2(\tau)} \quad \text{Expression 6}$$

The late reverberation onset for an AIR is defined as the time when Expression 5 is greater than or equal to one, or when $\eta(n) \geq 1$. The late reverberation onset may be an example of an acoustic parameter of an AIR which is used to determine whether an AIR is plausible (i.e., whether the AIR corresponds to a single AIR from a single room). In an example, the late reverberation onset of an AIR may be compared to a threshold value to determine whether the late reverberation onset occurs before the threshold value (indicative of multiple convolved AIRs) or whether the late reverberation onset occurs after the threshold value (indicative of a single AIR). The PDA engine may be trained to estimate the late reverberation onset from the observed audio signal 134 in order to determine whether an AIR of the observed audio signal 134 is characteristic of multiple convolved AIRs or a single AIR, which may be used to determine whether a playback attack is being performed.

Another example of an acoustic parameter of AIRs which can be used to analyze an AIR is the energy decay curve of the AIR. The energy decay curve of an AIR is one way to quantify the decay of an AIR. The energy decay curve is directly linked to a reverberation time and may be used to calculate the reverberation time of an AIR. An AIR formed by convolving two or more AIRs will generally have a longer reverberation time than a single AIR.

The energy decay curve (EDC) is given in Expression 7:

$$EDC(t) = \int_t^\infty h^2(\tau)\, d\tau \quad \text{Expression 7}$$

The PDA engine may be trained to estimate the EDC from the observed audio signal 134 in order to determine whether an AIR of the observed audio signal 134 is characteristic of multiple convolved AIRs or a single AIR, which may be used to determine whether a playback attack is being performed.

Another example of an acoustic parameter of AIRs which can be used to analyze an input AIR is the spectral standard deviation (SSTD) of the input AIR. The SSTD of an AIR describes the spectral characteristics of the AIR. An AIR formed by convolving two or more AIRs will have a different SSTD than a single AIR independent of the sampling rate.

The SSTD is given in Expression 8:

$$\sigma_L = \sqrt{1/N \sum_{k=0}^{N-1} [H(k) - \underline{H}(k)]^2} \quad \text{Expression 8}$$

In Expression 8, H(k) is the log-spectral magnitude resulting from a discrete N-point discrete Fourier transform (DFT) of h(h), and H(k) is the average of H(k) across frequency. The PAD engine may be trained to estimate the SSTD from the observed audio signal 134 in order to determine whether an AIR of the observed audio signal 134 is characteristic of multiple convolved AIRs or a single AIR, which may be used to determine whether a playback attack is being performed.

The PAD engine may be trained to estimate one or more of the late reverberation onset, the EDC, and the SSTD (and other acoustic parameters) of an AIR of the observed audio signal 134 to determine whether the AIR of the observed audio signal 134 is characteristic of a playback attack (e.g., is a convolved AIR characteristic of playback). By estimating the acoustic parameters and then analyzing the acoustic parameters to detect a playback attack, the PAD engine can be trained without any playback attack data. In an example, the PAD engine can be trained using synthetically generated training signals including single AIRs and convolved AIRs together with any set of anechoic speech recordings in order to estimate the acoustic parameters from the training speech signals directly. In an example, training data may be created using anechoic speech recordings and measured or synthetic acoustic impulse responses for at least two different locations (or rooms). In this way, the PAD engine can utilize a zero-shot approach to detecting playback attacks.

In some implementations, the PAD engine may include one or more functions for estimating parameters which do not require training. In an example, the PAD engine includes a standard deviation operator to estimate the SSTD of the observed audio signal 134, allowing the PAD engine to estimate the SSTD without training.

As described herein, a computing device (e.g., analytics server 202 of FIG. 2) executes software of a PAD engine of a machine-learning architecture for detecting presentation attacks (e.g., replay attacks, synthetic speech attacks) by analyzing acoustic characteristics resulting from reverberation. The software of the PAD engine includes a machine-learning model (e.g., parameter estimation machine-learning model) based on one or more machine-learning techniques and may be trained to generate and analyze certain acoustic parameters of the acoustic impulse responses. The computing device executing the PAD engine may receive the acoustic impulse responses as a component of the observed audio signal 134. The PAD engine estimates acoustic parameters due to the acoustic impulse responses from the observed audio signal 134 (e.g., a speech signal of the observed audio signal 134) directly, which the PAD engine uses to determine whether the target audio source 122 that originated the observed audio signal 134 and projected audio wave 132 is a live person or a presentation attack audio source. As an example, where the target audio source 122 is a live person, the acoustic parameters of the impulse response received with the observed audio signal 134 will indicate that the reverberation impacting the audio wave 132 and the observed audio signal 134 occurred within a single enclosed acoustic space 120. As such, the PAD engine may determine the target audio source 122 is more likely a live person. As another example, where the target audio source 122 includes a loudspeaker playing a recorded replay of a person's voice, then the acoustic parameters of the impulse response will indicate that the reverberation in the observed audio signal 134 occurred from multiple enclosed spaces (e.g., including the enclosed acoustic space 120 containing the loudspeaker playing the recording of the person's voice, and an earlier acoustic space in which the person's voice was originally recorded). As such, the PAD engine may determine the target audio source 122 is more likely the source of a presentation attack.

In some implementations, the estimated acoustic parameters may be used in combination with any other type of PAD method. The estimated acoustic parameters may be included as a feature in a feature vector or combined with analysis of other characteristics in a score fusion approach. In an example, the estimated acoustic parameters are included in a feature vector including features such as input device, noise level, and other features. In an example, the estimated acoustic parameters are used in combination with noise level scores to determine whether an input audio signal represents a presentation attack in a score fusion approach.

FIG. 2 shows components of a system 200 for receiving and analyzing call data received during contact events, according to an embodiment. The system 200 comprises an analytics system 201, service provider systems 210 of various types of enterprises (e.g., companies, government entities, universities), and the end-user devices 214 (e.g., landline phone 214*a*, mobile phone 214*b*, and computing device 214*c*). The analytics system 201 includes analytics servers 202, analytics databases 206, and admin devices 203. The service provider system 210 includes provider servers 211, provider databases 212, and agent devices 216. Embodiments may comprise additional or alternative components or omit certain components from what is shown in FIG. 2, yet still fall within the scope of this disclosure. It may be common, for example, for the system 200 to include multiple provider systems 210, or for the analytics system 201 to have multiple analytics servers 202. It should also be appreciated that embodiments may include or otherwise implement any number of devices capable of performing the various features and tasks described herein. For example, the FIG. 2 shows the analytics server 202 as a distinct computing device from the analytics database 206, though in some embodiments, the analytics database 206 may be integrated into the analytics server 202.

The system 200 describes an embodiment of call risk analysis, which in some embodiments may include caller identification, performed by the analytics system 201 on behalf of the provider system 210. The risk analysis operations are based on the acoustic impulse response and/or other characteristics of a projected audio wave 132 or observed audio signal 134 captured by a microphone 124 of an end-user device 214. The analytics server 202 executes software programming of a machine-learning architecture having various types of functional engines, implementing certain machine-learning techniques and machine-learning models for analyzing the call audio data (e.g., observed audio signal 134, impulse responses from the microphone 124), which the analytics server 202 receives from the provider system 210. The machine-learning architecture of the analytics server 202 analyzes the various forms of the call audio data to perform the various risk assessment or caller identification operations.

The various components of the system 200 may be interconnected with each other through hardware and software components of one or more public or private networks. Non-limiting examples of such networks may include: Local Area Network (LAN), Wireless Local Arca Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 214 may communicate with callees (e.g., service provider systems 210) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

The analytics system 201 and the provider system 210 are network system infrastructures 201, 210 comprising physically and/or logically related collections of software and electronic devices managed or operated by various enterprise organizations. The devices of each network system infrastructure 201, 210 are configured to provide the intended services of the particular enterprise organization.

The call analytics system 201 is operated by a call analytics service that provides various call management, security, authentication (e.g., speaker verification), and analysis services to customer organizations (e.g., corporate call centers, government entities). Components of the call analytics system 201, such as the analytics server 202, execute various processes using audio data in order to provide various call analytics services to the organizations that are customers of the call analytics service. In operation, a caller uses a caller end-user device 214 to originate a telephone call to the service provider system 210. The microphone 124 of the caller device 214 observes the caller's speech (projected audio waves 132) and generates the audio data represented by the observed audio signal 134. The audio data includes, for example, impulse response data for analyzing reverberation caused by one or more enclosed spaces. The caller device 214 transmits the audio data for the observed audio signal 134 to the service provider system 210. The interpretation, processing, and transmission of the audio data may be performed by components of telephony networks and carrier systems (e.g., switches, trunks), as well as by the caller devices 214. The service provider system 210 then transmits the call analytics system 201 to perform various analytics and downstream audio processing operations. It should be appreciated that analytics servers 202, analytics databases 206, and admin devices 203 may each include or be hosted on any number of computing devices comprising a processor and software and capable of performing various processes described herein.

The service provider system 210 is operated by an enterprise organization (e.g., corporation, government entity) that is a customer of the call analytics service. In operation, the service provider system 210 receives the audio data and/or the observed audio signal 134 associated with the telephone call from the caller device 214. The audio data may be received and forward by one or more devices of the service provider system 210 to the call analytics system 201 via one or more networks. For instance, the customer may be a bank that operates the service provider system 210 to handle calls from consumers regarding accounts and product offerings. Being a customer of the call analytics service, the bank's service provider system 210 (e.g., bank's call center) forwards the audio data associated with the inbound calls from consumers to the call analytics system 201, which in turn performs various processes using the audio data, such as analyzing acoustic characteristics of impulse responses to detect presentation attacks, on behalf of the bank, among other voice or audio processing services for risk assessment or speaker identification. It should be appreciated that service provider servers 211, provider databases 212 and agent devices 216 may each include or be hosted on any number of computing devices comprising a processor and software and capable of performing various processes described herein.

The end-user device 214 may be any communications or computing device the caller operates to place the telephone call to the call destination (e.g., the service provider system 210). The end-user device 214 may comprise, or be coupled to, a microphone 124. Non-limiting examples of caller devices 214 may include landline phones 214*a* and mobile phones 214*b*. It should be appreciated that the caller device 214 is not limited to telecommunications-oriented devices (e.g., telephones). As an example, a calling end-user device 214 may include an electronic device comprising a processor and/or software, such as a computing device 214*c* or Internet of Things (IoT) device, configured to implement voice-over-IP (VOIP) telecommunications. As another example, the caller computing device 214*c* may be an electronic IoT device (e.g., voice assistant device, "smart device") comprising a processor and/or software capable of utilizing telecommunications features of a paired or otherwise networked device, such as a mobile phone 214*b*.

In the example embodiment of FIG. 2, when the caller places the telephone call to the service provider system 210, the caller device 214 instructs components of a telecommunication carrier system or network to originate and connect the current telephone call to the service provider system 210. When the inbound telephone call is established between the caller device 214 and the service provider system 210, a computing device of the service provider system 210, such as a provider server 211 or agent device 216 forwards the observed audio signal 134 (and/or audio data sampled using components in the calling device 214 from the observed audio signal 134) received at the microphone 124 of calling device 214 to the call analytics system 201 via one or more computing networks. The embodiment of FIG. 2 is merely a non-limiting example use for case of understanding and description.

The analytics server 202 of the call analytics system 201 may be any computing device comprising one or more processors and software, and capable of performing the various processes and tasks described herein. The analytics server 202 may host or be in communication with the analytics database 206 and may receive and process the audio data from the one or more service provider systems 210. Although FIG. 2 shows only single analytics server 202, it should be appreciated that, in some embodiments, the analytics server 202 may include any number of computing devices. In some cases, the computing devices of the analytics server 202 may perform all or sub-parts of the processes and benefits of the analytics server 202. The analytics server 202 may comprise computing devices operating in a distributed or cloud computing configuration and/or in a virtual machine configuration. It should also be appreciated that, in some embodiments, functions of the analytics server 202 may be partly or entirely performed by the computing devices of the service provider system 210 (e.g., the service provider server 211).

In operation, the analytics server 202 may execute various software-based processes of the machine-learning architecture on the call data, which may include impulse response data and/or the observed audio signal 134. The machine-learning architecture includes the PAD engine, which is trained to estimate and/or analyze the acoustic parameters and detect likely presentation attacks using the impulse responses. The operations of the analytics server 202 may include, for example, receiving the impulse responses or observed audio signal 134 associated with the calling device 214, parsing the impulse responses or observed audio signal 134 into frames and sub-frames, processing the impulse responses of the observed audio signal 134 for generating various acoustic parameters based upon the impulse responses, and analyzing the various acoustic parameters to determine whether the acoustic parameters are characteristic of a single AIR or convolved AIRs, among other operations. In particular, the analytics server 202 executes a neural network architecture to estimate acoustic parameters of an AIRs directly from an observed audio signal. The acoustic parameters may then be used to determine whether the AIR of the observed audio signal is a single AIR or multiple convolved AIRs, indicative of a playback attack.

The analytics server 202 trains the neural network (or other type of machine-learning model) of the PAD engine to determine the acoustic parameters using training impulse responses of training audio signals, which may be previously received observed audio signals 134, simulated synthetic audio signals, or clean genuine audio signals. The training audio signals can be stored in one or more corpora that the analytics server 202 references during training. The training audio signals received from each corpus are each associated with a label indicating the known acoustic parameter scores for the particular training audio signal. The analytics server 202 executes a loss function that references these labels to determine a level of error during training.

In some implementations, the analytics server 202 trains the PAD engine according to a zero-shot approach, where the training impulse responses of the training audio signals do not include any instances of impulse responses from presentation attacks.

The analytics server 202 trains the PAD engine based on inputs (e.g., training audio signals), predicted outputs (e.g., calculated parameter scores), and expected outputs (e.g., labels associated with the training impulse responses or training audio signals). The training audio signal is fed to the neural network, which the neural network uses to generate a predicted output (e.g., predicted parameter scores) by executing the current state of the neural network using the training impulse responses of the training audio signals. The analytics server 202 executes a loss function of the PAD engine that references and compares the label associated with the training impulse response of the training audio signal (e.g., expected parameter scores) against the predicted parameter scores generated by the current state of the neural network to determine the amount of error or differences. The analytics server 202 tunes parameters or weighting coefficients of one or more neural network layers to reduce the amount of error (or loss), thereby minimizing the differences between (or otherwise converging) the predicted output and the expected output.

The training audio signals can include any number of clean audio signals that are audio recordings or audio signals having little or no noise, which the analytics server 202 may receive from the corpus (e.g., a speech corpus). The clean audio signal includes a speech signal originating from a genuine, "live" human-speaker.

The analytics server 202 may further generate training audio signals, to simulate clean or noisy audio signals for training purposes. In operation, the analytics server 202 applies simulated audio signals (containing simulated AIRs) to real speech recordings. The corpora containing examples of additive noise and/or multiplicative noise will often have a limited number of recordings or variations. Consequently, there is a need for the analytics server 202 to simulate audio signals to generate one or more training audio signals, which can simulate multiplicative noise (e.g., by convolving a clean audio signal containing speech with a simulated acoustic impulse response) and, in some embodiments, additive noise (e.g., background noise).

Additionally or alternatively, the analytics server 202 may generate training audio signals that simulate multiplicative noise by degrading clean audio signals containing speech using simulated acoustic impulse responses, thereby increasing the diversity of examples of multiplicative noise. The analytics server will generate acoustic impulse responses to simulate varied room sizes, positions of the target audio source, and positions of the microphones. Each simulated audio signal is then stored along with the labels representing the known acoustic parameters applied to generate the particular simulated audio signal. As an example, the analytics server 202 generates simulated acoustic impulse responses using either previously measured acoustic impulse responses or simulated using, for example, the image-source method or modified image-source method that generates the acoustic impulse response based on sending and receiving audio waves in controlled circumstances and known acoustic parameters. In some cases, the analytics server 202 generates the simulated training audio signals so as to train a specific type of acoustic parameter. In such cases, the analytics server 202 applies constraints to the process of generating impulse responses, to control for and mitigate the ordinary inherent interplay between the acoustic parameters.

The analytics server 202 may perform various pre-processing operations on the observed audio signal 134 during deployment. The analytics server 202 may also perform one or more pre-processing operations on the training audio signals (e.g., clean audio signals, simulated audio signals). The pre-processing operations can advantageously improve the speed at which the analytics server 202 operates or reduce the demands on computing resources when executing the neural network using the observed audio signal 134 or training audio signals.

During pre-processing, the analytics server 202 parses the observed audio signal 134 into audio frames containing portions of the audio data and scales the audio data embedded in the audio frames. The analytics server 202 further parses the audio frames into overlapping sub-frames. The frames may be portions or segments of the observed audio signal 134 having a fixed length across the time series, where the length of the frames may be pre-established or dynamically determined. The sub-frames of a frame may have a fixed length that overlaps with adjacent sub-frames by some amount across the time series. For example, a one-minute observed audio signal could be parsed into sixty frames with a one-second length. Each frame may be parsed into four 0.25 sec sub-frames, where the successive sub-frames overlap by 0.10 sec.

The analytics server 202 may transform the audio data into a different representation during pre-preprocessing. The analytics server 202 initially generates and represents the observed audio signal 134, frames, and sub-frames according to a time domain. The analytics server 202 transforms the sub-frames (initially in the time domain) to a frequency domain or spectrogram representation, representing the energy associated with the frequency components of the observed audio signal 134 in each of the sub-frames, thereby generating a transformed representation. In some implementations, the analytics server 202 executes a Fast-Fourier Transform (FFT) operation of the sub-frames to transform the audio data in the time domain to the frequency domain. For each frame (or sub-frame), the analytics server 202 performs a simple scaling operation so that the frame occupies the range [−1, 1] of measurable energy.

In some implementations, the analytics server 202 may employ a scaling function to accentuate aspects of the speech spectrum (e.g., spectrogram representation). The speech spectrum, and in particular the voiced speech, will decay at higher frequencies. The scaling function beneficially accentuates the voiced speech. The analytics server 202 may perform an exponentiation operation on the array resulting from the FFT transformation. An example of the exponentiation operation performed on the array (Y) may be given by $Ye=Y^{\alpha}$, where $\alpha$ is the exponentiation parameter. The values of the exponentiation parameter may be any value greater than zero and less than or equal to one (e.g., $\alpha=0.3$). The analytics server 202 feeds the outputs of the exponentiation operation into an input layer of the neural network architecture. In some cases, these outputs are further scaled as required for the input layer.

The parameters and/or the acoustic parameter score determined by the analytics server 202, will be forwarded to or otherwise referenced by one or more downstream applications to perform various types of audio and voice processing operations that assess or rely upon the neural network output (e.g., acoustic parameter scores). The downstream application may be executed by the provider server 211, the analytics server 202, the admin device 203, the agent device 216, or any other computing device. Non-limiting examples of the downstream applications or operations may include speaker verification, speaker recognition, speech recognition, voice biometrics, audio signal correction, or degradation mitigation (e.g., dereverberation), and the like.

The provider server 211 of a service provider system 210 executes software processes for managing a call queue and/or routing calls made to the service provider system 210, which may include routing calls to the appropriate agent devices 216 based on the caller's comments, such as the agent of a call center of the service provider. The provider server 211 can capture, query, or generate various types of information about the call, the caller, and/or the calling device 214 and forward the information to the agent device 216, where a graphical user interface on the agent device 216 is then displayed to the call center agent containing the various types of information. The provider server 211 also transmits the information about the inbound call to the call analytics system 201 to preform various analytics processes, including the observed audio signal 134 and any other audio data. The provider server 211 may transmit the information and the audio data based upon a preconfigured triggering conditions (e.g., receiving the inbound phone call), instructions or queries received from another device of the system 200 (e.g., agent device 216, admin device 203, analytics server 202), or as part of a batch transmitted at a regular interval or predetermined time.

The analytics database 206 and/or the provider database 212 may contain any number of corpora that are accessible to the analytics server 202 via one or more networks. The analytics server 202 may access a variety of corpora to retrieve clean audio signals, previously received audio signals, recordings of background noise, and acoustic impulse response audio data. The analytics database 206 and/or provider database 212 may contain any number of corpora that are accessible to the analytics server 202 via one or more networks. The analytics database 206 may also query an external database (not shown) to access a third-party corpus of clean audio signals containing speech or any other type of training signals (e.g., example noise).

The analytics database 206 and/or the provider database 212 may store information about speakers or registered callers as speaker profiles. A speaker profile are data files or database records containing, for example, audio recordings of prior audio samples, metadata and signaling data from prior calls, a trained model or speaker vector employed by the neural network, and other types of information about the speaker or caller. The analytics server 202 may query the profiles when executing the neural network and/or when executing one or more downstream operations. For example, when the analytics server 202 performs a downstream voice biometric operation to authenticate the caller, the analytics server 202 could determine a confidence value (retrieved from a table specifying a range of acoustic parameter scores (e.g., reverberation or other types of degradation parameter scores) associated with a profile in the call analytics database 206 and/or provider database 212) based on the acoustic parameter score of the inbound call. The profile could also store the registered feature vector for the registered caller, which the analytics server 202 references when determining a similarity score between the registered feature vector for the registered caller and the feature vector generated for the current caller who placed the inbound phone call.

In some implementations, the analytics database 206 and/or the provider database 212 stores initialized acoustic parameter scores (e.g., reverberation or other types of degradation parameter scores) for use by the analytics server 202 during the training phase (or deployment phase) of the neural network. The initialized acoustic parameter scores may be determined by users (e.g., using admin devices 203 or agent devices 216) or dynamically determined by the analytics server 202 (e.g., previous acoustic parameter scores from particular callers or groups of callers, generated randomly, generated pseudo-randomly).

The admin device 203 of the call analytics system 201 is a computing device allowing personnel of the call analytics system 201 to perform various administrative tasks or user-prompted analytics operations. The admin device 203 may be any computing device comprising a processor and software, and capable of performing the various tasks and processes described herein. Non-limiting examples of the admin device 203 may include a server, personal computer, laptop computer, tablet computer, or the like. In operation, the user employs the admin device 203 to configure the operations of the various components of the call analytics system 201 or service provider system 210 and to issue queries and instructions to such components.

The agent device 216 of the service provider system 210 may allow agents or other users of the service provider system 210 to configure operations of devices of the service provider system 210. For calls made to the service provider system 210, the agent device 216 receives and displays some or all of the relevant information associated with the call routed from the provider server 211.

Example Neural Network for Parameter Estimation

Figure 3:
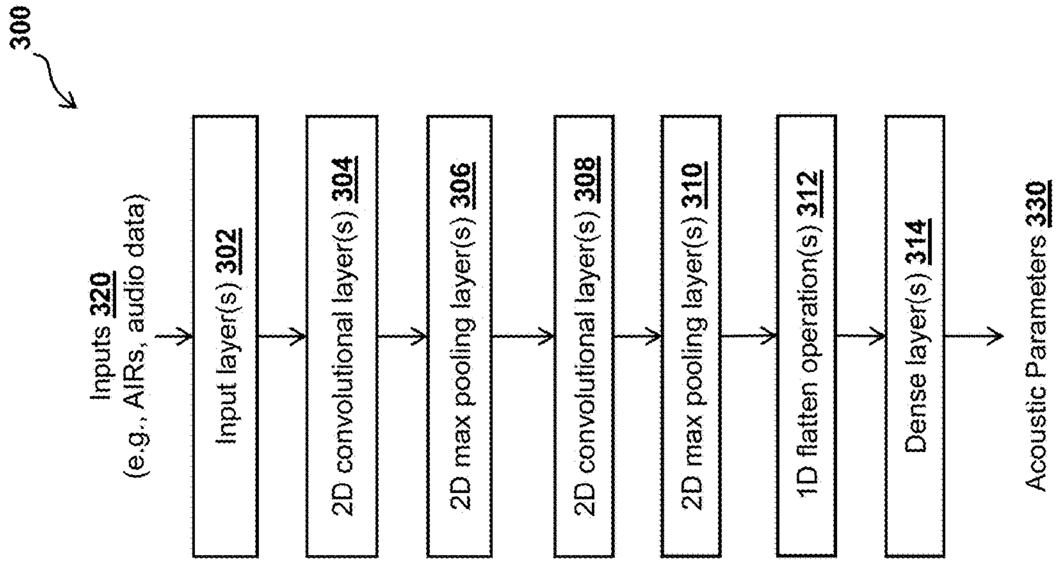
FIG. 3 shows an end-to-end neural network architecture employed by a computing device to determine acoustic parameters, according to an embodiment.

FIG. 3 shows an example neural network architecture 300 executed by a server (or other computing device) for determining acoustic parameters according to illustrative embodiments. The neural network architecture 300 is an end-to-end system that ingests audio data of an observed audio signal, extracts features from the observed audio signal, and determines the acoustic parameters of the observed audio signal, such as acoustic parameters of the AIR of the observed audio signal. The architecture 300 may determine the acoustic parameters jointly and/or separately and may determine scores corresponding to an intensity or level of the acoustic parameters. It should, however, be appreciated that embodiments may include additional or alternative operations, or may omit operations, from those shown in FIG. 3, yet still fall within the scope of this disclosure. In addition, the neural network architecture 300 may alternate multiple convolutional layers and pooling layers (e.g., first convolutional layer 304, first pooling layer 306, second convolutional layer 308, second pooling layer 310) or consecutively perform multiple convolutional layers and pooling layers.

The neural network architecture 300 employs one or more various high-level feature-extraction representation layers to extract features from the audio data and generate arrays representing the extracted features. The other layers then evaluate the extracted features to determine the acoustic parameter scores. The one or more high-level data-representation extraction layers include any number of techniques for feature extraction and representation typically employed with convolutional neural networks (CNNs), deep neural networks (DNNs), and recurrent neural networks (RNNs), among others.

In some instances, the neural network architecture uses one or more initialized acoustic parameter scores when determining the acoustic parameter scores.

FIG. 3 shows the layers of an end-to-end neural network architecture 300 executed by a server, according to an embodiment. The neural network architecture 300 determines acoustic parameters 330 based on inputs 320. In some implementations, the neural network architecture includes a convolutional neural network. In some implementations, the acoustic parameters 330 include the late reverberation onset, the EDC, and the SSTD.

An input layer 302 of the neural network architecture 300 ingests the inputs 320 as various types of audio data or call data. The inputs 320 may include, for example, an observed audio signal having an acoustic impulse response (AIR). Additionally or alternatively, in some implementations, the inputs 320 may include the AIR as the input data or a component of the input audio data.

The first convolutional layer 304 detects the features of the observed audio signal using the data ingested at the input layer 302. The first convolutional layer 304 convolves a filter and/or kernel with the input 320 according to the dimensions and operations of the filter, thereby generating a feature map of the extracted features.

The first max-pooling layer 306 (or any other type of pooling layer) detects prominent features. The first max-pooling layer 306 reduces the dimensionality of the feature map to down-sample the feature map for more efficient operation. The first max-pooling layer 306 then detects the prominent features having higher relative values in a pooling window comprising a set of values that is a predetermined length and/or duration. It should be appreciated that the first max-pooling layer 306 is not limited to max pooling and may be any type of pooling layer, such as average pooling.

The second convolutional layer 308 receives the down-sampled feature map and generates a second feature map on the down-sampled feature maps. The second convolutional layer 308 may convolve the same and/or a different filter employed in the first convolutional layer 304 with the down-sampled feature maps, thereby generating the second feature map.

The second max pooling layer 310 (or other type of pooling layer) down-samples the second feature map from the second convolutional layer 308 to detect the prominent features. The second max-pooling layer 310 may apply the same or a different type of pooling layer as in the first max pooling 306. The second max-pooling layer 310 reduces the dimensionality of the features maps to down-sample the feature map for more efficient operation. The max-pooling layer 306 then detects the prominent features having higher relative values in a pooling window comprising a set of values that is a predetermined length and/or duration.

The neural network architecture 300 may perform a dropout operation on the flattened feature map from the second max pooling layer 310, which drops one or more nodes of the down-sampled feature map. The dropout operation may reduce overfitting of the neural network architecture 300 to the training data by randomly dropping information from the down-sampled feature map. In an example, the dropout operation may be performed by a dropout layer of the neural network architecture 300.

The neural network architecture 300 performs a flattening operation 312 on the down-sampled feature map from the second max pooling layer 310, which flattens the down-sampled feature map. The flattening operation 312 arranges the down-sampled feature map (represented as an array) into one-dimensional vectors, thereby casing the computational burdens of the device executing the neural network architecture 300. The flattening operation 312 may be performed by a flattening layer of the neural network architecture 300.

The one-dimensional vectors are fed into various neurons of the dense layer(s) 314 and the optional hidden layers (not shown) within the dense layer(s) 314. The neurons in the dense layer(s) 314 may connect to other neurons in the dense layer(s) 314 via algorithmic weights. The server optimizes the algorithmic weights during training such that the dense layer(s) 314 learn the relationship of the acoustic parameters according to the features extracted from the observed audio signal (the one-dimensional vector). During deployment (sometimes referred to as "testing"), the dense layer(s) 314 employs the trained relationships of the acoustic parameters to determine, or estimate, the acoustic parameters 330. In some implementations, the acoustic parameters 330 include the late reverberation onset, the EDC, and the SSTD. In this way, the neural network architecture 300 determines acoustic parameters 330 such as the late reverberation onset, the EDC, and the SSTD based on inputs 320.

The neural network architecture 300 may include multiple estimators including respective input layers and dense layers. The neural network architecture 300 may use the multiple estimators to determine different acoustic parameters of the acoustic parameters 330. In an example, a first estimator determines the late reverberation onset, a second estimator determines the EDC, and a third estimator determines the SSTD. The multiple estimators may receive as input the acoustic parameters determined by the other multiple estimators. In this example, the first estimator receives as input the EDC and SSTD, the second estimator receives as input the late reverberation onset and the SSTD, and the third estimator receives as input the late reverberation onset and the EDC. In this way, the acoustic parameters 330 may be jointly determined to increase an accuracy of the determined acoustic parameters 330.

Example Pad Operations

Figure 4:
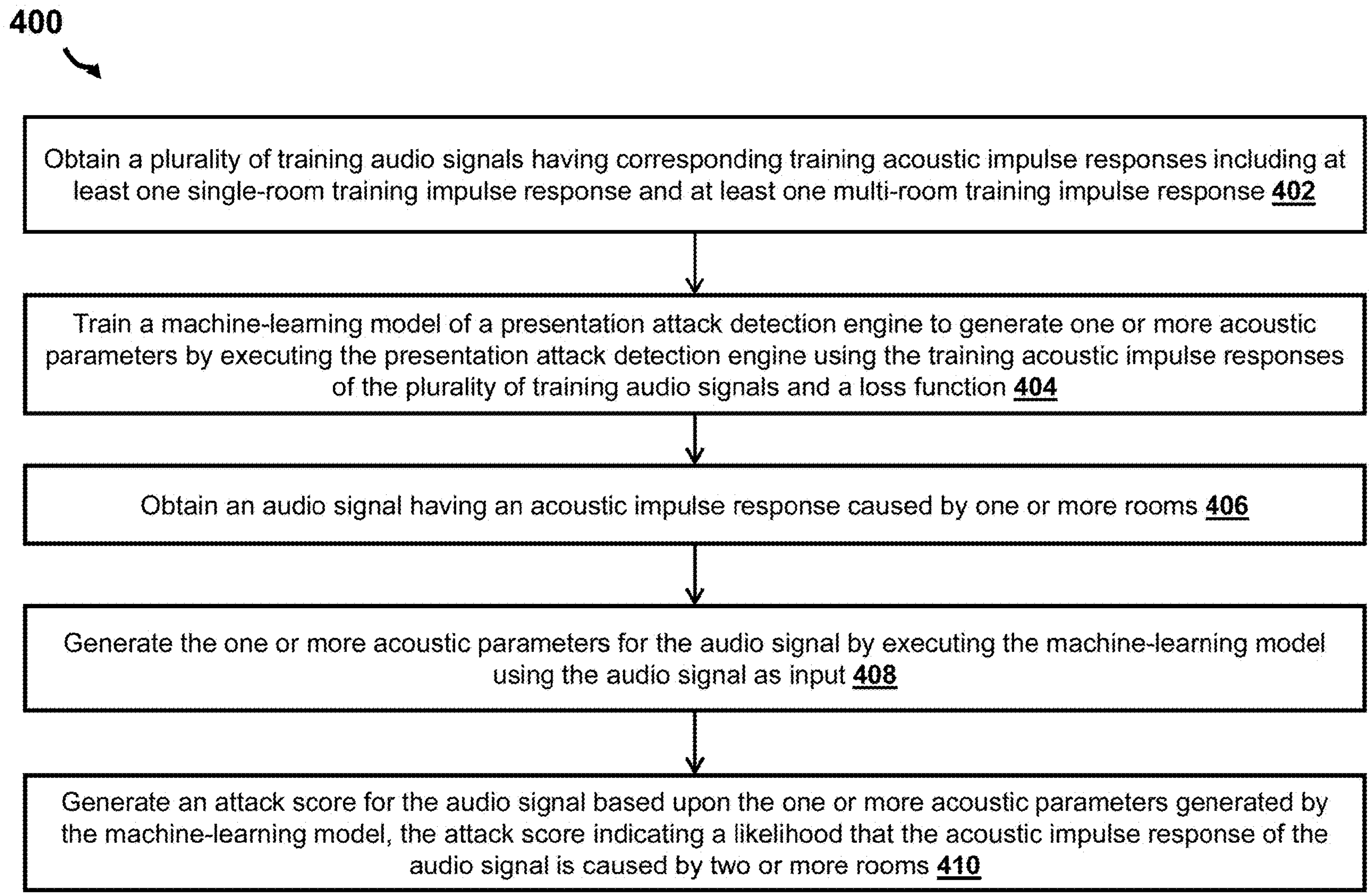
FIG. 4 shows operations of a method for training, developing, and deploying a machine-learning architecture for evaluating fraud risk based on presentation attack detection, according to an embodiment.

FIG. 4 shows operations of an example method 400 for training, developing, and deploying a machine-learning architecture for evaluating fraud risk based on presentation attack detection, according to an embodiment. Embodiments may include additional, fewer, or different operations than those described in the method 400. The method 400 is performed by a server executing machine-readable software code of a neural network architecture comprising any number of neural network layers and neural networks, though the various operations may be performed by one or more computing devices and/or processors. In some implementations, the method 400 is performed by one or more components of the system 200.

At operation 402, a plurality of training audio signals is obtained having corresponding training acoustic impulse responses (AIRs) including at least one single-room training AIR and at least one multi-room training AIR. The multi-room training AIR may be the result of recording a first audio signal in a first room and then playing back the recorded first audio signal in a second room to record a second recorded audio signal. The second recorded audio signal has an AIR formed by convolving a first AIR of the first audio signal in the first room and a second AIR of the first audio signal in the second room. The convolved AIR has acoustic parameters that are different from acoustic parameters of the single-room AIR, as discussed herein.

In some implementations, obtaining the plurality of training audio signals includes generating the plurality of training audio signals. Generating the plurality of training audio signals may include using a source-image method using random room dimensions, a random RT for each room, and/or random positions for a source and microphone. The plurality of training audio signals may be labeled with the generation parameters for the training audio signals. In some implementations, the plurality of training audio signals is generated having AIRs of one or more known (and labeled) acoustic parameters. In an example, the plurality of training audio signals is generated having training AIRs of various EDCs, late reverberation onsets, and/or SSTDs. In this way, the plurality of training audio signals may be generated to include AIRs that vary according to one or more of the EDC, late reverberation onset, and SSTD.

In some implementations, the plurality of training audio signals are speech samples. The speech samples may be real speech samples and/or synthetic speech samples. The speech samples may have various AIRs corresponding to different recording environments (real or simulated).

At operation 404, a machine-learning model of a presentation attack detection engine is trained to generate one or more acoustic parameters by executing the presentation attack detection engine using the training impulse responses of the plurality of training audio signals and a loss function. The machine-learning model may be referred to as a parameter estimation machine-learning model. The machine-learning model may be trained using labels of the plurality of training audio signals. The labels of the plurality of training audio signals may indicate the one or more acoustic parameters of the training impulse responses. The machine-learning model may estimate the one or more acoustic parameters and the estimated acoustic parameters may be compared to the actual acoustic parameters. The machine-learning model may be updated based on a difference (i.e., distance, loss) between the estimated acoustic parameters and the actual acoustic parameters. The loss function may be determined to minimize the difference between the estimated acoustic parameters and the actual acoustic parameters. In some implementations, the loss function is a mean absolute error (MAE) between the actual (i.e., measured) acoustic parameters and the estimated (i.e., generated) acoustic parameters.

In some implementations, the machine-learning model is trained until the loss satisfies a predetermined loss threshold. In an example, the machine-learning model is trained until the difference between the measured and generated acoustic parameters is below a predetermined percentage difference.

In some implementations, the one or more acoustic parameters include at least one of spectral standard deviation (SSTD), late reverberation onset, or energy decay curve (EDC). In an example, the machine-learning model is trained to generate the SSTD from an input audio signal.

At operation 406, an audio signal is obtained having an acoustic impulse response caused by one or more rooms.

In some implementations, the audio signal is a speech sample to which a pre-emphasis filter is applied. The pre-emphasis filter may be applied to counter the inherent spectral decay of speech. The pre-emphasis speech filter may be defined as in Expression 9:

$$y(n) = x(n) + \alpha x(n-1) \quad \text{Expression 9}$$

In Expression 9, x(n) is the speech sample and α is between zero and one. In an example, α is set to 0.9 and the pre-emphasized speech sample is divided into non-overlapping frames of 0.5 s and a spectrogram is calculated for each frame with a DFT frame size of 512 samples and 256 sample overlap. In this example, application of the pre-emphasis filter and the calculation of the spectrogram allows for accurate estimation of the SSTD of the acoustic impulse response of the speech sample.

In an example, the audio signal is an audio signal of a contact event (e.g., phone call, VOIP call, remote access, webpage access) for authentication of a speaker. The machine-learning model may be applied to the audio signal to authenticate the speaker based on the audio signal having a probable AIR. A probable AIR may be an AIR characteristic of live speech in a plausible recording environment. An improbable AIR may be an AIR characteristic of recorded speech (one or more convolved AIRs), speech in an implausible recording environment (no AIR, AIR of a room having implausible dimensions), and/or synthetic speech (inconsistent AIR, implausibly changing AIR).

At operation 408, the one or more acoustic parameters for the audio signal are generated by executing the machine-learning model using the audio signal as input. The machine-learning model may generate the one or more acoustic parameters jointly or separately, as discussed herein. The acoustic parameters may be acoustic parameters of the AIR of the audio signal, such as the EDC, late reverberation onset, and SSTD. Generating the one or more acoustic parameters may include generating one or more scores for the acoustic parameters. In an example, the machine-learning model may generate a confidence score for an array of SSTDs, where each confidence score corresponds to a likelihood of the SSTD in the array of SSTDs being the SSTD of the AIR of the audio signal.

In some implementations, the AIR of the audio signal is a type of AIR not represented in the training audio signals. In an example, the machine-learning model generates the one or more acoustic parameters of the type not represented in the training audio signals. In an example, the audio signal is a presentation attack, where the training audio signals do not include presentation attack audio signals. In this way, the machine-learning model may be trained using a zero-shot approach where the machine learning model can generate the one or more acoustic parameters for presentation attack audio signals and thus detect presentation attacks without being trained using presentation attack audio signals. As discussed herein, the machine-learning model may be trained using synthetic training data to generate the one or more acoustic parameters. By generating the acoustic parameters and analyzing the generated acoustic parameters to detect presentation attacks, the machine-learning model may be trained to detect presentation attacks without being trained using presentation attack audio signals.

At operation 410, an attack score for the audio signal is generated based upon the one or more acoustic parameters generated by the machine-learning model, the attack score indicating a likelihood that the acoustic impulse response of the audio signal is caused by two or more rooms. In some implementations, generating the attack score includes comparing the one or more generated acoustic parameters to predetermined parameter thresholds. In an example, the generated SSTD is compared to a predetermined SSTD threshold to determine whether the SSTD is characteristic of a single room or two or more rooms.

In some implementations, generating the attack score includes executing a second machine-learning model using the one or more acoustic parameters as input. The second machine-learning model may be referred to as a PAD scoring machine-learning model. The second machine-learning model may be trained based on the training data, where the second machine-learning model is trained to take as input the labeled acoustic parameters and output a determination as to whether the AIR is characteristic of a single room or two or more rooms. A loss function for the second machine-learning model may be determined to minimize inaccurate determinations of the second machine-learning model.

The one or more acoustic parameters may be weighted according to a sample rate of the audio signal. In an example, the late reverberation onset may more accurately distinguish between single AIRs and convolved AIRs at a sample rate of 48 KHz than at a sample rate of 16 kHz. In this example, the late reverberation onset may be weighted more heavily when the audio signal has a sample rate of 48 kHz. In this way, the one or more acoustic parameters can be weighted to reflect when they are most effective at distinguishing between single AIRs and convolved AIRs. The one or more acoustic parameters may be weighted according to other characteristics of the audio signal, such as volume, pitch, speaker identity, etc.

The attack score may indicate a likelihood that a speech of the audio signal is synthetic speech. As discussed herein, the one or more acoustic parameters may be indicative of synthetic speech. In an example, synthetic speech is generated using training data having a variety of AIRs such that the synthetic speech has a variety of AIRs. The AIR of the synthetic speech may not be consistent throughout the audio signal, which would be implausible for real speech, as the AIR corresponds to the recording environment. An inconsistent AIR may correspond to changing characteristics and/or dimensions of the recording environment. Thus, generating the attack score for the audio signal may include determining whether the acoustic impulse response of the audio signal is consistent throughout the audio signal. In some implementations, analyzing the one or more acoustic parameters includes determining whether the acoustic parameters correspond to a plausible AIR (an AIR of a room with plausible dimensions and characteristics, a changing AIR corresponding to movement between rooms with plausible dimensions and characteristics).

The method 400 may include detecting that the audio signal is a presentation attack in response to determining that the attack score satisfies an attack score threshold.

The method 400 may include segmenting the audio signal into a plurality of frames, wherein the computer executes the presentation attack engine using each frame of the audio signal as input to the presentation attack engine. The segmenting of the audio signal may aid in analyzing time-domain acoustic parameters of the audio signal, such as the EDC and the late reverberation onset.

The method 400 may include transforming the audio signal into a spectral domain representation, wherein the computer executes the presentation attack engine using the spectral representation of the audio signal as input to the presentation attack engine. Transforming the audio signal into the spectral domain representation may aid in analyzing frequency-domain acoustic parameters of the audio signal, such as the SSTD.

The method 400 may include extracting a feature vector for the one or more acoustic parameters of the acoustic impulse response of the audio signal. The machine-learning model may extract the feature vector from the generated acoustic parameters. Generating the acoustic parameters may include extracting the feature vector for the acoustic parameters from the audio signal.

The method 400 may include determining a speaker identity associated with the audio signal. The machine-learning model may determine a speaker identity of a speaker of the audio signal. In some implementations, determining the speaker identity includes identifying speech and non-speech portions of the audio signal. The machine-learning model may generate the acoustic parameters for the speech and/or non-speech portions of the audio signal. In some implementations, determining the speaker identity includes comparing a speaker feature vector extracted from the audio signal with an enrolled speaker feature vector.

The method 400 may include mapping the one or more generated acoustic parameters to speech quality and/or audio quality. The one or more generated acoustic parameters may be indicative of the speech quality and/or audio quality. In some implementations, mapping the one or more generated acoustic parameters to the speech quality and/or audio quality includes using the one or more generated acoustic parameters as input for a quality machine-learning model to determine the speech quality or the audio quality.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

obtaining, by a computer, a plurality of training audio signals having corresponding training acoustic impulse responses including at least one single-room training acoustic impulse response and at least one combined multi-room training acoustic impulse response corresponding to the training acoustic impulse responses from two or more rooms;

training, by the computer, a parameter estimation machine-learning model of a presentation attack detection (PAD) engine to estimate one or more acoustic parameters by executing the parameter estimation machine-learning model of the PAD engine using the training acoustic impulse responses of the plurality of training audio signals and a loss function using a plurality of training labels corresponding to the training audio signals, each training label indicating one or more training acoustic parameters for the training acoustic impulse response in the corresponding training audio signal;

obtaining, by the computer, an audio signal having an acoustic impulse response caused by one or more rooms, the acoustic impulse response of the audio signal including at least one of a single room acoustic impulse response or a combined multi-room acoustic impulse response; and generating, by the computer, the one or more acoustic parameters for the audio signal by executing the parameter estimation machine-learning model using the audio signal as input.

2. The method according to claim 1, further comprising generating, by the computer, an attack score for the audio signal based upon the one or more acoustic parameters by executing a PAD scoring machine-learning model of the PAD engine, the attack score indicating a likelihood that the acoustic impulse response of the audio signal is caused by two or more rooms.

3. The computer-implemented method of claim 2, further comprising detecting, by the computer, that the audio signal is a presentation attack in response to determining that the attack score satisfies an attack score threshold.

4. The computer-implemented method of claim 2, wherein generating the attack score for the audio signal includes determining, by the computer, whether the acoustic impulse response of the audio signal is consistent throughout the audio signal.

5. The computer-implemented method of claim 1, further comprising segmenting, by the computer, the audio signal into a plurality of frames, wherein the computer executes the PAD engine using each frame of the audio signal as input to the presentation attack engine.

6. The computer-implemented method of claim 1, further comprising transforming, by the computer, the audio signal into a spectral domain representation, wherein the computer executes the PAD engine using the spectral representation of the audio signal as input to the PAD engine.

7. The computer-implemented method of claim 1, wherein the one or more acoustic parameters include at least one of: spectral standard deviation, late reverberation onset, SNR, or energy decay curve.

8. The computer-implemented method of claim 1, further comprising extracting, by the computer, a feature vector for the one or more acoustic parameters of the acoustic impulse response of the audio signal.

9. The computer-implemented method of claim 1, wherein obtaining the plurality of training audio signals includes generating, by the computer, one or more of the plurality of training audio signals according to a simulated environment.

10. The computer-implemented method of claim 1, wherein the acoustic impulse response of the audio signal is a type of acoustic impulse response not represented in the training audio signals.

11. A non-transitory computer-readable medium comprising machine-executable instructions which, when executed by one or more processors, cause the one or more processors to:

obtain a plurality of training audio signals having corresponding training acoustic impulse responses including at least one single-room training acoustic impulse response and at least one combined multi-room training acoustic impulse response corresponding to the training acoustic impulse responses from two or more rooms;

train a parameter estimation machine-learning model of a presentation attack detection (PAD) engine to estimate one or more acoustic parameters by executing the parameter estimation machine-learning model of the PAD engine using the training acoustic impulse responses of the plurality of training audio signals and a loss function using a plurality of training labels corresponding to the training audio signals, each training label indicating one or more training acoustic parameters for the training acoustic impulse response in the corresponding training audio signal;

obtain an audio signal having an acoustic impulse response caused by one or more rooms, the acoustic impulse response of the audio signal including at least one of a single room acoustic impulse response or a combined multi-room acoustic impulse response; and generate the one or more acoustic parameters for the audio signal by executing the machine-learning model using the audio signal as input.

12. The non-transitory computer-readable medium of claim 11, wherein the instructions further cause the one or more processors to generate an attack score for the audio signal based upon the one or more acoustic parameters by executing a PAD scoring machine-learning model of the PAD engine, the attack score indicating a likelihood that the acoustic impulse response of the audio signal is caused by two or more rooms.

13. The non-transitory computer-readable medium of claim 12, wherein the instructions further cause the one or more processors to detect that the audio signal is a presentation attack in response to determining that the attack score satisfies an attack score threshold.

14. The non-transitory computer-readable medium of claim 12, wherein, when generating the attack score for the audio signal, the instructions further cause the one or more processors to determine whether the acoustic impulse response of the audio signal is consistent throughout the audio signal.

15. The non-transitory computer-readable medium of claim 11, wherein the instructions further cause the one or more processors to segment the audio signal into a plurality of frames, and execute the PAD engine using each frame of the audio signal as input to the presentation attack engine.

16. The non-transitory computer-readable medium of claim 11, wherein the instructions further cause the one or more processors to transform the audio signal into a spectral domain representation, and execute the PAD engine using the spectral representation of the audio signal as input to the PAD engine.

17. The non-transitory computer-readable medium of claim 11, wherein the one or more acoustic parameters include at least one of: spectral standard deviation, late reverberation onset, SNR, or energy decay curve.

18. The non-transitory computer-readable medium of claim 11, wherein the instructions further cause the one or more processors to extract a feature vector for the one or more acoustic parameters of the acoustic impulse response of the audio signal.

19. The non-transitory computer-readable medium of claim 11, wherein, when obtaining the plurality of training audio signals, the instructions further cause the one or more processors to generate one or more of the plurality of training audio signals in a simulated environment.

20. The non-transitory computer-readable medium of claim 11, wherein the acoustic impulse response of the audio signal is a type of acoustic impulse response not represented in the training audio signals.

* * * * *